United States Patent [19]

Tsuji et al.

[11] Patent Number: 5,586,025

[45] Date of Patent: Dec. 17, 1996

[54] RULE-BASED ELECTRONIC AGENT SYSTEM AND METHOD THEREOF

[75] Inventors: Hiroshi Tsuji, Itami; Yoji Taniguchi, Ikeda; Tadashi Hirose, Komae; Toyozo Aoyama, Oosaka; Shuzo Tomohiro, Yokohama; Satoshi Wakayama, Sakae, all of Japan

[73] Assignee: Hitachi, Ltd., Tokyo, Japan

[21] Appl. No.: 956,303

[22] Filed: Oct. 5, 1992

[30] Foreign Application Priority Data

Oct. 7, 1991 [JP] Japan .................................... 3-259208

[51] Int. Cl.⁶ .................................................. G06F 17/60
[52] U.S. Cl. ............................................ 395/761; 395/51
[58] Field of Search ........................... 395/926, 934, 395/909, 51, 61, 76; 364/419.1

[56] References Cited

U.S. PATENT DOCUMENTS

| | | | |
|---|---|---|---|
| 4,958,285 | 9/1990 | Tominaga . | |
| 4,959,799 | 9/1990 | Yoshiura et al. | 395/51 |
| 5,148,370 | 9/1992 | Litt et al. | 364/468 |
| 5,155,803 | 10/1992 | Barabash et al. | 395/64 |
| 5,267,348 | 11/1993 | Someya et al. | 395/61 |

FOREIGN PATENT DOCUMENTS

| | | |
|---|---|---|
| 60-134371 | 7/1985 | Japan . |
| 63-183843 | 7/1988 | Japan . |

OTHER PUBLICATIONS

Lai, et al. "Object Lens: A 'Spreadsheet' for Cooperative Work," ACM –0-89791-282-9/88/0115, 1988, pp. 115–124. (English).

Tsuji, Hiroshi, et al. "ELISE: Office Procedures Automation Tool by State-Transition Model," Journal of Information Processing, vol. 12, No. 1, 1988, pp. 9–15. (English).

Primary Examiner—Robert A. Weinhardt
Attorney, Agent, or Firm—Fay, Sharpe, Beall, Fagan, Minnich & McKee

[57] ABSTRACT

Rules registered in the electronic secretary system are defined by separating each of them into a trigger descriptor part, a condition part for object data retrieval, and an action part, and a flag indicating whether or not to fire a rule and a flag indicating whether or not to suppress firing of a rule after it is fired once are installed in each rule, and a flag for selecting whether to automatically activate the action when object data is retrieved or to activate the action after the user confirms it is installed, and an area for storing the period and timing for judging success or failure of the condition when necessary is referred to so as to change the corresponding flag to ON or OFF or to change the period and, whether to automatically execute the electronic secretary system or to execute it after a human confirms it, can be selected freely.

8 Claims, 7 Drawing Sheets

RULE 1

20a
- 21a — TRIGGER DESCRIPTOR PART
  - FIRING FLAG : ON —— 31a
  - REPETITION FLAG : ON —— 32a
  - TIMING : AT 9AM EVERY DAY
- 22a — CONDITION PART FOR OBJECT DATA RETRIEVAL
  - TYPE : TABLE
  - FILE : MAIL BOX
  - AUTHOR :
- 23a — ACTION DESCRIPTOR PART
  - CONFIRMATION FLAG : OFF —— 33a
  - PROCESS : MOVE TO THE BUDGET FILE

FIG. 4

RULE 2

20b
- 21b — TRIGGER DESCRIPTOR PART
  - FIRING FLAG : OFF —— 31b
  - REPETITION FLAG : OFF —— 32b
  - TIMING :
- 22b — CONDITION PART FOR OBJECT DATA RETRIEVAL
  - TITLE : SUMMATION
  - FILE : BUDGET FILE
  - AUTHOR :
- 23b — ACTION DESCRIPTOR PART
  - CONFIRMATION FLAG : ON —— 33b
  - PROCESS : TRANSFER TO SUZUKI

FIG. 5

RULE 3

20c ⎯ {
  21c ⎯ [ TRIGGER DESCRIPTOR PART
        FIRING FLAG : ON ⎯ 31c
        REPETITION FLAG : OFF ⎯ 32c
        TIMING : AT 9AM ON EVERY MONDAY   22c ⎯ [ CONDITION PART FOR OBJECT DATA RETRIEVAL
        TYPE : TABLE
        FILE : BUDGET FILE
        AUTHOR : OTA   23c ⎯ [ ACTION DESCRIPTOR PART
        CONFIRMATION FLAG : OFF ⎯ 33c
        PROCESS : SUMMATION

RULE-BASED ELECTRONIC AGENT SYSTEM AND METHOD THEREOF

BACKGROUND OF THE INVENTION

1. Field of the Invention

The present invention relates to a method and system for an electronic secretary for storing various object operations such as documents and tables using the office automation (OA) software and for allowing the electronic secretary optionally to exchange the registered automatic operation for the manual operation and vice versa.

2. Description of the Prior Art

Recently, word processors, personal computers, facsimile equipment, copying machines, telephone sets, and Photo-electro-magnetic files have been used as OA equipment. Each of the above equipments has been improved in usability as equipment for special use (stand-alone equipment) at first. However, some of those equipments have been combined as an OA equipment with multi-function and automated and networked increasingly. The above explanation is directed to the development process of hardware. As to modification of OA software (OA support software for office work improvement), only most suitable software corresponding to hardware has been designed. For example, although word processors etc. (their software for supporting document correction and edition) are widespread, the greater part of current office work is still at the early stage of computerization and the improvement in office work productivity is extremely low compared with the modification those of productivity in the field of production engineering.

To solve such a problem, an attempt has been made to describe a part of the office work as a rule and to automate the part by executing it in an event-driven manner so as to increase the productivity. Such a system is called an electronic secretary system or an intellectual agent. It is described, for example, in Japanese Patent Laid-Open No. 60-134371, "Method and Apparatus for Storing and Using Information", or ELISE "Office Procedures Automation Tool by State-Transition Model, Journal of Information Processing, Vol. 12, No. 1, 1989", Hiroshi Tsuji and Fumihiko Mori, or Object Lens "A Spreadsheet for Cooperative Work, Proc. of CSCW-88", Kum-Yew Lai and Thomas W. Malone.

In these conventional methods, however, emphasis is put only on automatization of a certain business and the rule only describes the condition part and the action part. Therefore, it is impossible for a human to confirm and process the business described in the rule or to stop activation of the rule for a given period. Lack of such consideration appears clearly in the expression of the rule for business description or in the fact that the function of the component for interpreting the rule is limited.

SUMMARY OF THE INVENTION

The object of the present invention is to provide a method and system for an electronic secretary, which are free from the problems inherent in the aforementioned prior art and which simply select and instruct to leave to automatic execution of the office work, which is expressed and stored in a rule, to the electronic secretary or to allow a human to confirm and execute the office work.

To accomplish the above object, the present invention presents a method and system for an electronic secretary in a system comprising a rule base for storing a pair of the object data (objects such as electronic document and spreadsheet) retrieval condition and the action definition information when the above retrieval condition is satisfied as a rule so as to use software resources including programs which can be executed by a user, files for storing various object data, and a user interface means, wherein a flag for indicating whether or not to select each rule as an object for execution, that is, ON or OFF for each rule at the time of definition of the rules is specified by the above user interface means, and the rules whose flags are ON are fetched one by one in order at the time of execution of the rules, and the object data which satisfies the retrieval condition of each of the above fetched rules is fetched, and the action defined by the rule corresponding to each of the fetched object data is taken.

Furthermore, the period and timing for retrieving the above object data for each rule at the time of fetching the above rules are specified by the above user interface means and the rules whose period and timing match the above specified period and timing are fetched one by one. Furthermore, when the above object data exists in each rule, a flag for selecting whether to automatically activate the above object data or to activate the above object data after a user confirms it is specified by the above user interface means.

These characteristics may be described more in detail as follows: (a) The electronic secretary system of the present invention for storing a pair of the object data retrieval condition and the definition information on the action when the retrieval condition is satisfied in the rule base as a rule so as to use software resources such as OA software and for activating when the object data exists in the file controlled by the OA software has a flag for identifying whether or not to fire each rule registered in the rule base and a user interface means for turning each flag ON or OFF. (b) The electronic secretary system also has an area for storing the period and timing for retrieving the object data for each rule registered in the rule base and a user interface means for changing the period. (c) The electronic secretary system also has a flag for selecting, when the object data exists in each rule registered in the rule base, whether to automatically activate the above object data or to activate the object data after a user confirms it and a user interface means for turning the flag ON or OFF. (d) The electronic secretary system also has a flag for identifying whether or not to fire each rule registered in the rule base at the retrieval specification time next to the retrieval specification time when the rule is fired once and a user interface means for turning the flag ON or OFF. (e) Each rule registered in the rule base has a condition part for object data retrieval and a descriptor part for action, and the specification method for the condition part for object data retrieval includes checking of the object data control information value of the OA software and binds the object data for acting, and the specification method for the action of the descriptor part for action includes specifying of the operation command of the OA software, and the object data which is bound by the condition part for retrieval when the rule is fired is commanded. (f) The area for storing the period and timing for retrieving the object data has a user interface means for activating the execution of a specific rule by specification of a user though not in the object data retrieval timing. (g) The electronic secretary system also has a user interface means for activating the execution of a rule, which is not specified to be fired, by a user without changing the flag for identifying whether or not to fire a rule. (h) The electronic secretary system also has a means for storing the index information of a rule for which the flag for identifying whether or not to fire is on. Furthermore, (i) the electronic secretary system also has a means for storing the log information on the action of a rule registered in the rule base which is fired and a means for referring to the log information. Next, the operation of the present invention will be described.

According to the present invention, as to a rule provided for the electronic secretary system wherein a business is expressed and stored beforehand, the occurrence time and type of an event for activating are defined in the descriptor part for trigger, and the object for processing is defined in the descriptor part for object retrieval condition, and the processing method is defined in the descriptor part for action. Furthermore, a flag for indicating whether or not to fire a rule, a flag for identifying whether or not to suppress firing of a rule which is fired once when an event for judging the next condition occurs, and an area for storing the period or timing for judging success or failure of the condition are installed in the descriptor part for trigger for each stored rule. Furthermore, a flag for selecting whether to automatically activate object data when the condition is satisfied or to activate it after a user confirms it is installed in the descriptor part for action for each stored rule, and the flag is turned ON or OFF or the period is changed by the interface.

By doing this, a user can leave his business to the electronic secretary system by his convenient method and can change the method when necessary.

The foregoing and other objects, advantages, manner of operation and novel features of the present invention will be understood from the following detailed description when read in connection with the accompanying drawings.

DETAILED DESCRIPTION OF THE PREFERRED EMBODIMENTS

Next, the embodiments of the present invention will be explained in detail with reference to the accompanying drawings.

Figure 1:
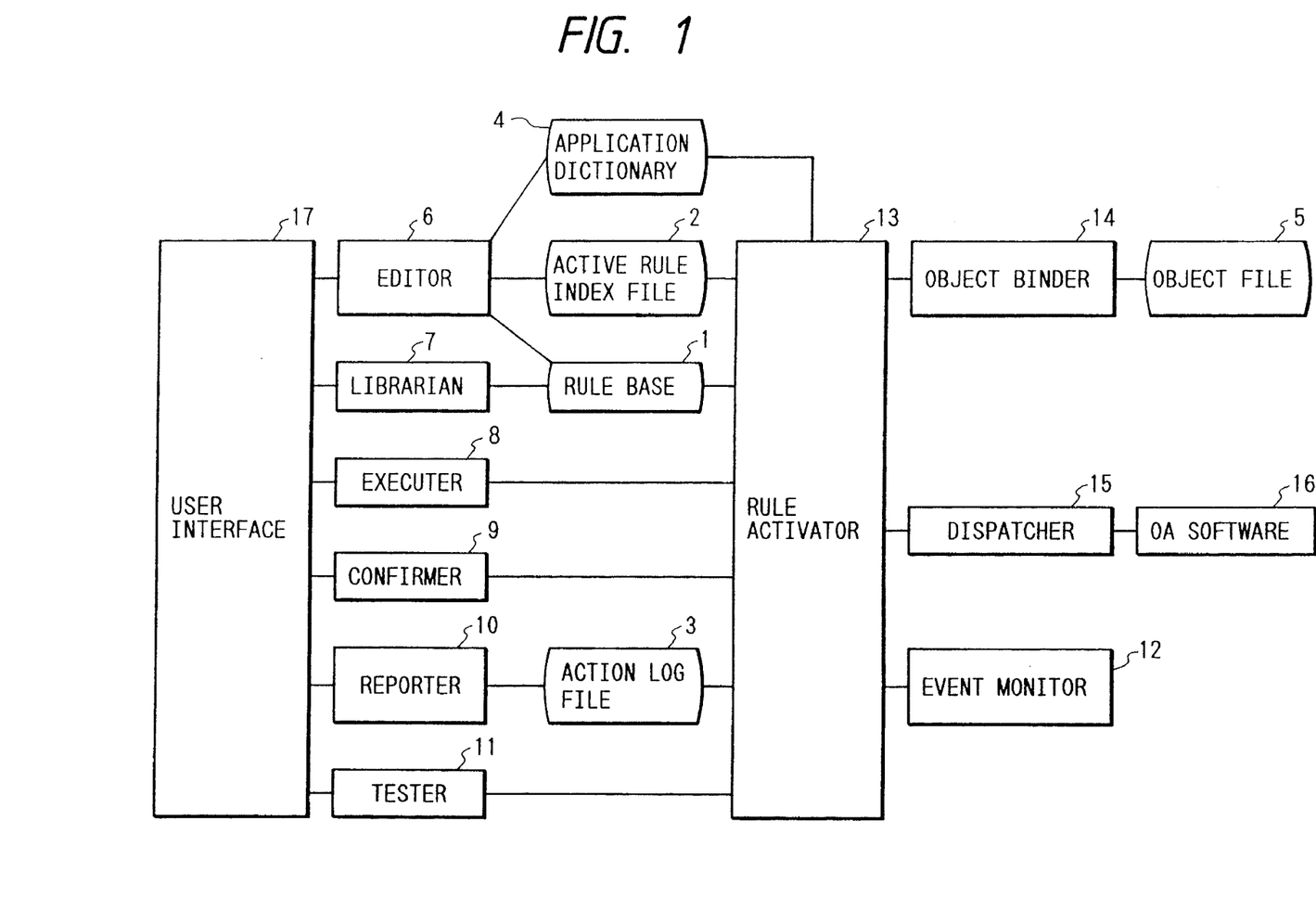
FIG. 1 is a functional block diagram of an electronic secretary system showing an embodiment of the present invention.

FIG. 1 is a block diagram of an electronic secretary system showing an embodiment of the present invention.

The electronic secretary system of this embodiment comprises, as shown in FIG. 1, five storage parts 1 to 5, eleven processing parts 6 to 16, and an I/O part 17.

Among the five storage parts 1 to 5, numeral 1 denotes a rule base for storing rules, 2 an active rule index file for pointing out only rules which are to be fired in an event-driven manner, 3 an action log file for storing records when the electronic secretary system executes rules, 4 an application dictionary which is a dictionary for the electronic secretary system to interface to OA applications, and 5 an object file for storing OA objects possessed by a user. The object file 5 is controlled by OA software.

Among the eleven processing parts, numeral 6 denotes an editor for editing rules, 7 a librarian for controlling the rule base, 8 an executor for executing rules stored in the rule base 1 by specification of a user, 9 a confirmer for confirming a user whether or not to activate a rule, 10 a reporter for referring to records executed by the electronic secretary system, 11 a tester for providing an event experimentally and testing the registered rule to check whether it operates normally, 12 an event monitor for monitoring external events, 13 a rule activator for extracting the rule to be activated, 14 an object binder for retrieving the OA object to be processed on the basis of the retrieval condition described in the rule, 15 a dispatcher for activating the OA software so as to activate the action described in the rule for the retrieved OA object, and 16 OA software for processing OA objects.

The user interface 17 for controlling input and output supervises and controls the user interface for the editor 6, the librarian 7, the executor 8, the confirmer 9, the reporter 10, and the tester 11.

Figure 2:
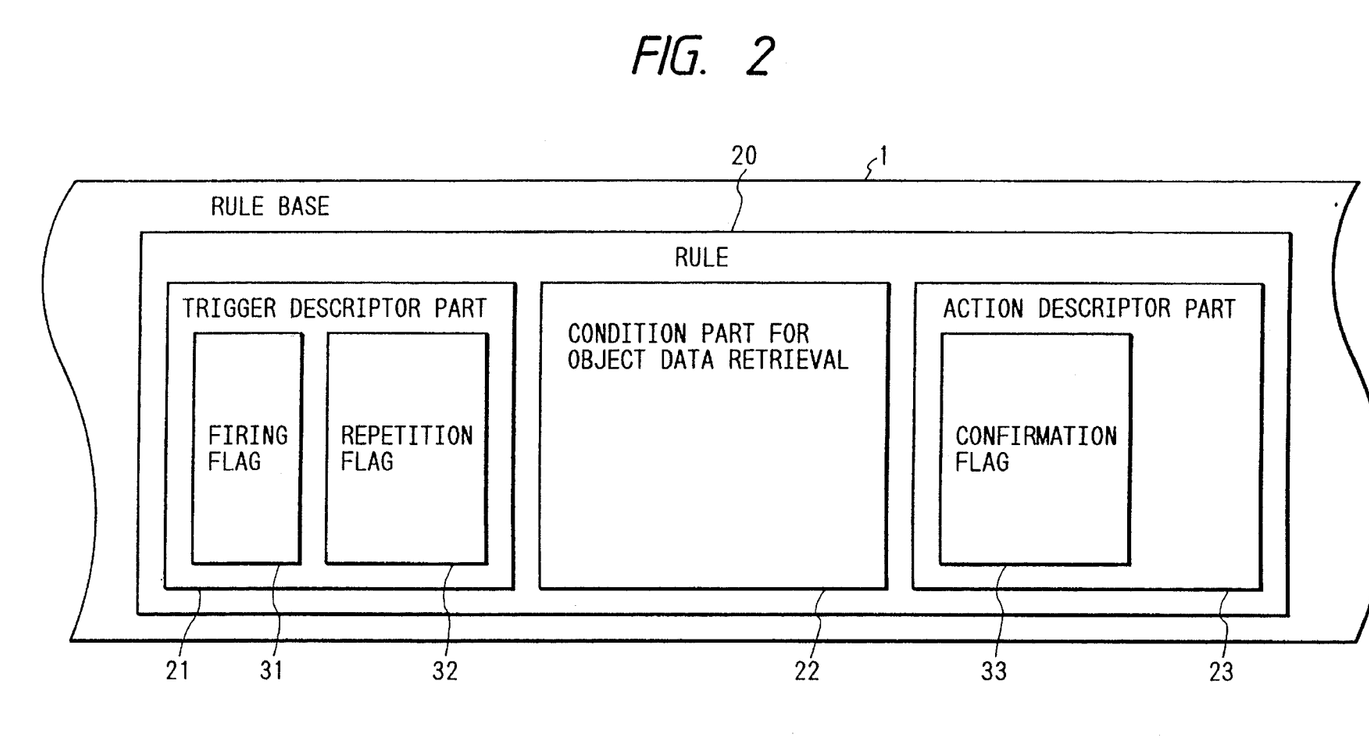
FIG. 2 is a drawing showing an information group stored in the rule base shown in FIG. 1.

FIG. 2 is a drawing showing an information group contained in a rule stored in the rule base shown in FIG. 1.

Each rule compress a trigger descriptor part 21, a condition part for object data retrieval 22, and an action descriptor part 23, which are all stored in the rule base 1. The trigger descriptor part 21 has an area for a firing flag 31 for indicating whether or not to fire a rule and a repetition flag 32 for identifying whether or not to fire a rule repeatedly after it is fired once.

The action descriptor part 23 has an area for a confirmation flag 33 for identifying whether or not to execute the fired rule without confirming a user.

In the rule base 1, as mentioned above, the trigger descriptor part 21 for indicating the processing time, the condition part for object data retrieval 22 for indicating the condition for selecting the object data for processing, and the action descriptor part 23 for indicating the processing method when a user leaves processing of a business to the electronic secretary system are stored as a rule.

When using an event such as arriving of the date and time or reception of a mail as a trigger as a processing time, the firing flag 31 is set to ON and then the event is described in the trigger descriptor part 21. On the other hand, when allowing the user to process the business whenever he wants to do, the firing flag 31 is set to OFF. In this case, there is no need to delete the information already described in the trigger descriptor part 21 and it may be left unchanged. The flag which is set at ON can be changed to OFF any time. By changing the flag to ON or OFF, the processing time can be left to the electronic secretary system or the business can be processed under leadership of the user. When activating a rule whenever an event occurs, the repetition flag 32 contained in the trigger descriptor part 21 is kept ON. On the other hand, when suppressing activation of a rule which is activated once, the repetition flag 32 is kept OFF. By installing this flag 32, a wasteful act such that the same processing may be repeated endlessly can be suppressed.

Furthermore, when the user allows the electronic secretary system to automatically execute a rule unless he confirms the object data particularly, the confirmation flag 33 of the action descriptor part 23 is kept OFF. When the object data is displayed once and the user allows the electronic secretary to process the rule after he confirms the object data inversely, the confirmation flag 33 is kept ON.

When a user sometimes confirms what the electronic secretary is going to do or he sometimes submits his task to the electronic secretary entirely, one of them can be changed to the other only by operating the flag.

Therefore, the user can leave the business to the electronic secretary system by his convenient method and can change the method freely.

Figure 3:
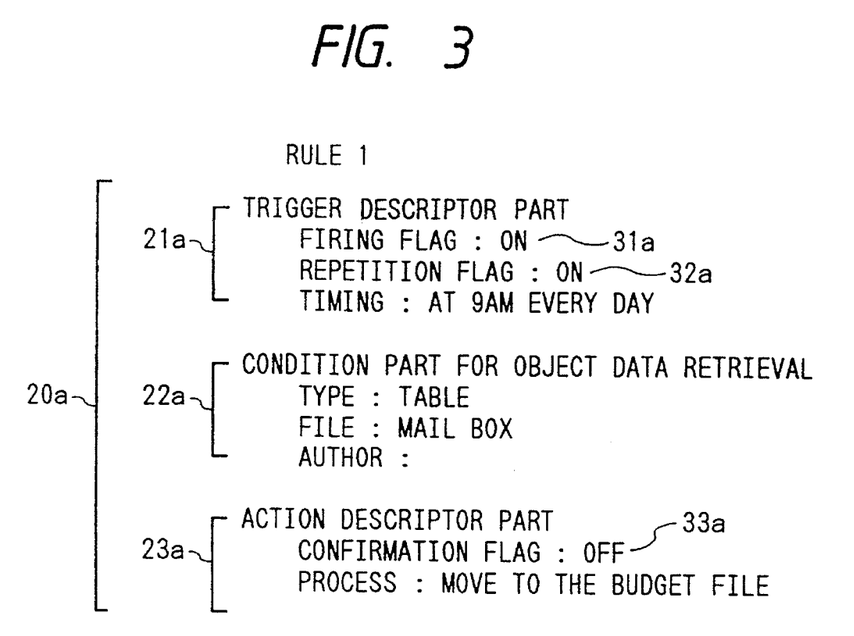
FIG. 3 is a drawing showing the description contents of Rule 1 described in each descriptor part shown in FIG. 2.
Figure 4:
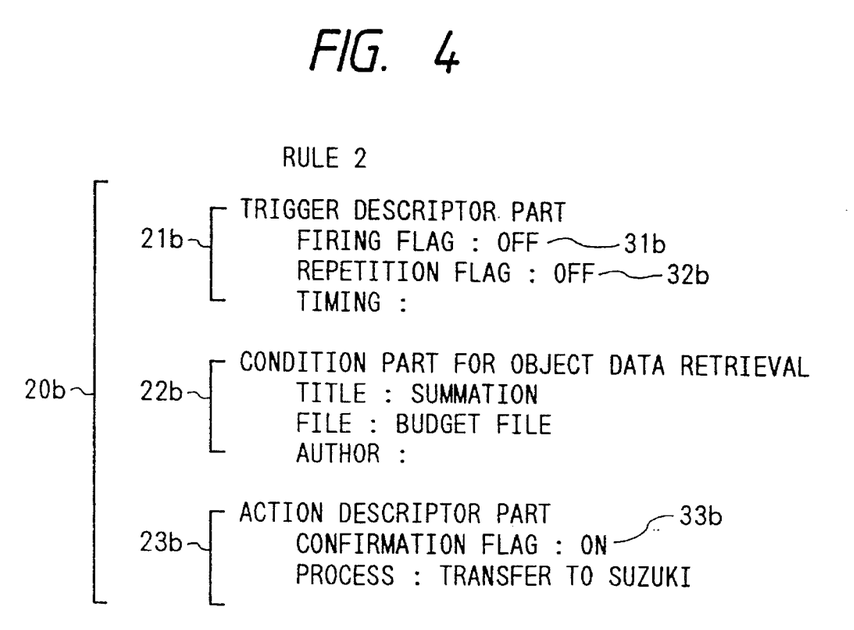
FIG. 4 is a drawing showing the description contents of Rule 2 described in each descriptor part shown in FIG. 2.
Figure 5:
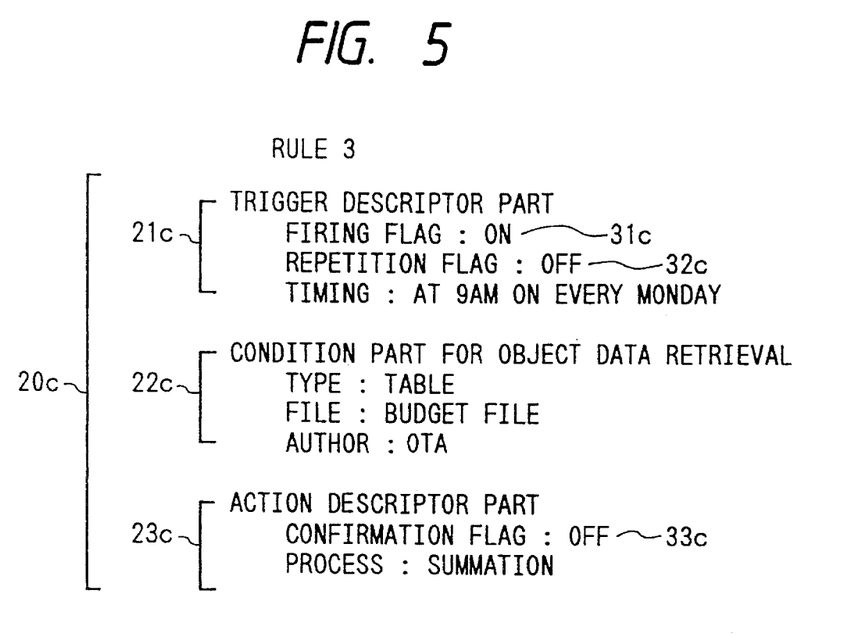
FIG. 5 is a drawing showing the description contents of Rule 3 described in each descriptor part shown in FIG. 2.

FIGS. 3, 4, and 5 are drawings showing examples of rules edited by the editor shown in FIG. 1.

FIG. 3 shows a rule 20a that when an OA object with a type of "Table" exists in the mail box at 9 AM every day, it moves to the budget file. This rule 20a becomes a firing object repeatedly every day because the repetition flag 32a is ON. Since the confirmation flag 33a is OFF, the electronic secretary system is automatically activated.

When an OA object with a title of "Summation" exists in the budget file, a rule 20b shown in FIG. 4 transfers it to Suzuki when the user specifies it explicitly because the firing flag 31b is OFF. Furthermore, since the confirmation flag 33b is ON, the rule 20b indicates the OA object which is retrieved by the user before transfer and inquires as to whether or not to execute the processing defined in the action descriptor part 23. When the user approves it, the rule 20b transfers the OA object to the destination.

A rule 20c, shown in FIG. 5 is activated at 9 AM on the first Monday though the repetitive flag 32c is OFF and the timing is defined as 9 AM on every Monday. When the rule 20c is activated, the firing flag is updated to OFF. Therefore, the rule 20c is activated once. When allowing this rule to be a firing object, it is necessary to change the firing flag to ON.

The rules shown in FIGS. 3 to 5 are stored in the rule base 1. The rules among them wherein the firing flag 31 is ON are indexed in the active rule index file 2. As described later, when an event occurs, the relevant rule name is registered in this file 2 using the date and time as a key so that the presence or absence of the rule corresponding to the event can be judged in a short time.

Figure 6:
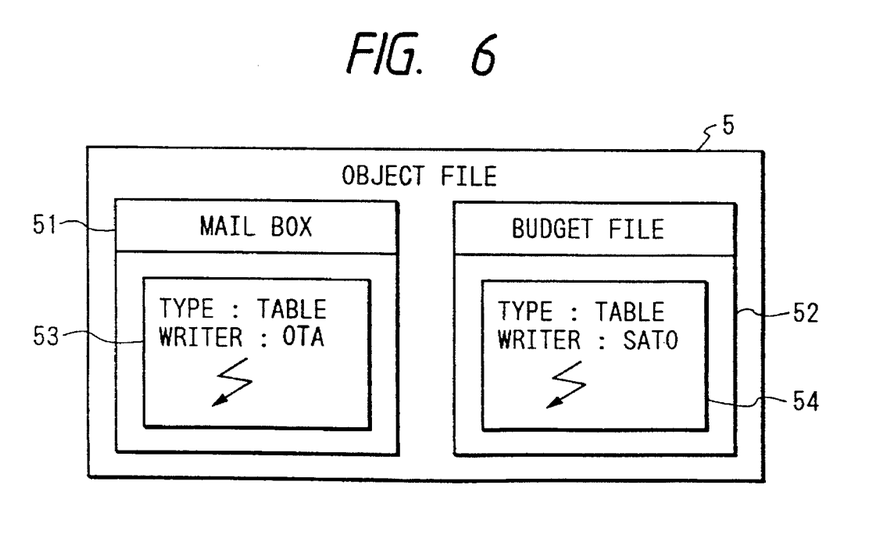
FIG. 6 is a detailed block diagram of the object file shown in FIG. 1.

FIG. 6 is a drawing showing an example of the object file shown in FIG. 1.

The object file 5 storing OA objects comprises a mail box 51 and a budget file 52 as shown in FIG. 6. The mail box has a table 53 of "Ota" and the budget file has a table 54 of "Sato". Tables 53 and 54 contain both control information such as the type and writer of the OA object and contents thereof respectively.

In the rule 20c shown in FIG. 5, whether tables of Sato and Ota exist in the budget file are checked at 9 AM on every Monday. Only when the two exist, the system automatically activates the processing described in the action part so as to execute the summation processing.

Figure 7:
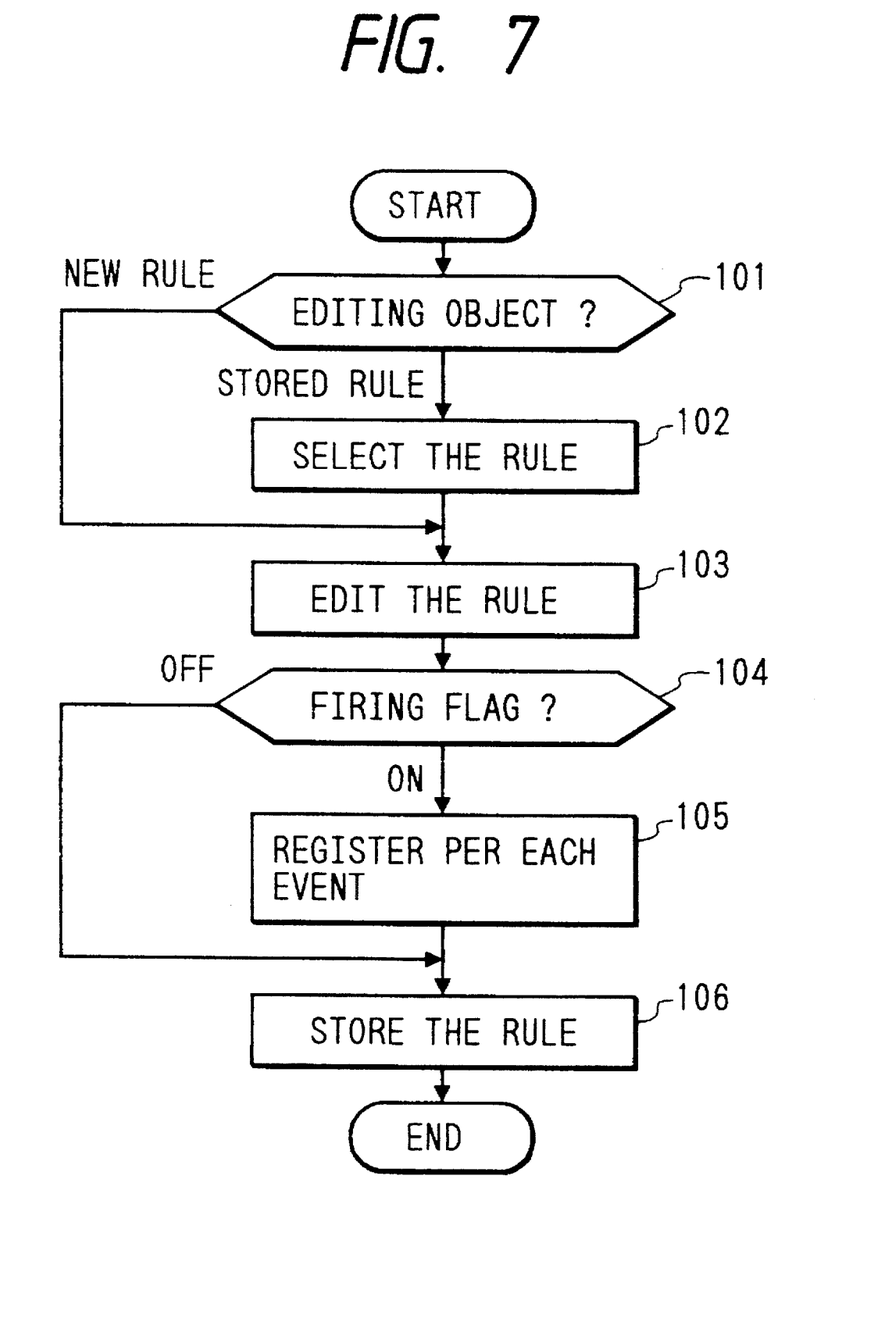
FIG. 7 is an operation flow chart of rule edition in the present invention.
Figure 8:
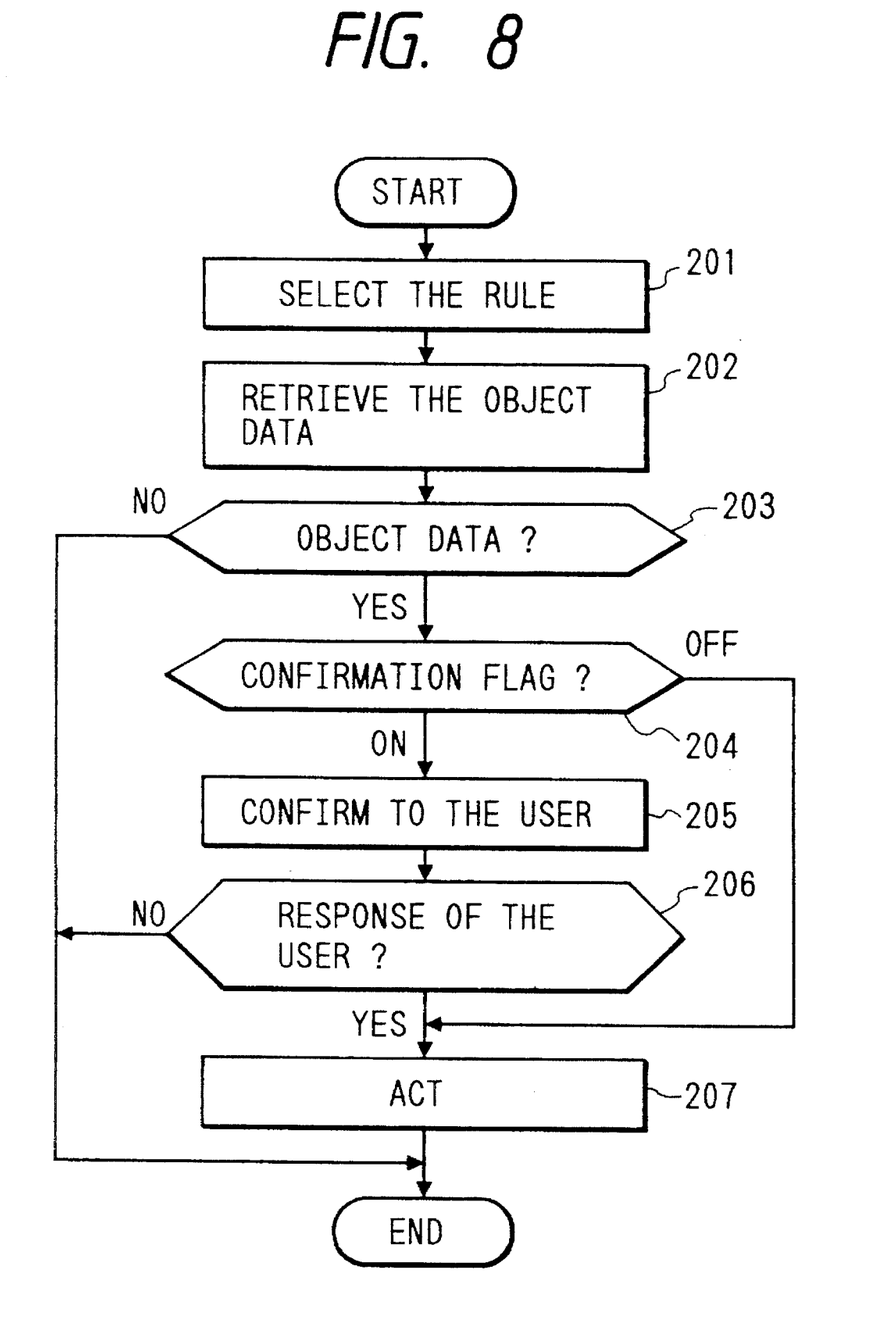
FIG. 8 is an operation flow chart when a user specifies and activates a rule in the present invention.
Figure 9:
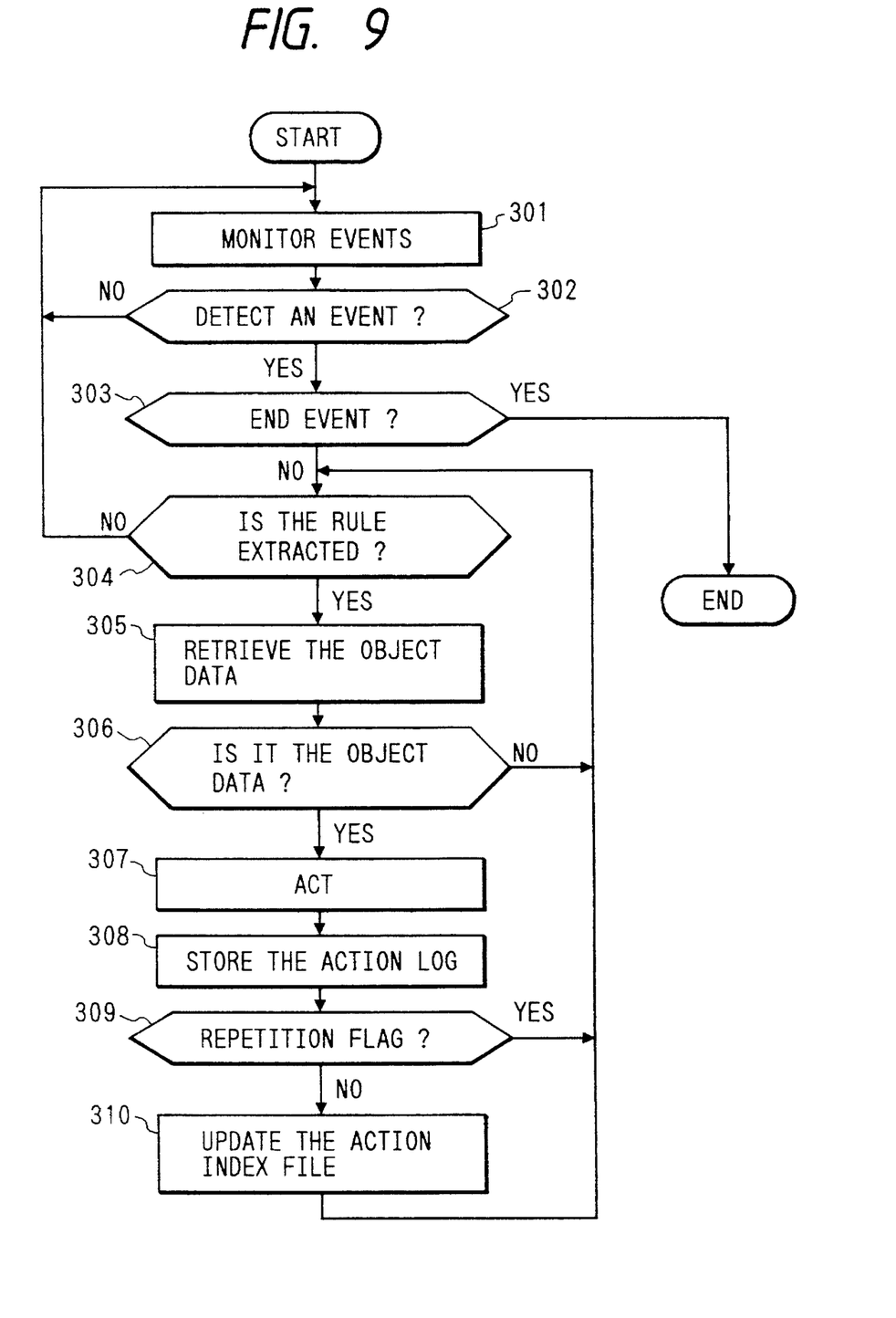
FIG. 9 is an operation flow chart when a user executes a registered rule by monitoring events in the present invention.

FIGS. 7 to 9 are operation flow charts of the electronic secretary system of the present invention. Among them, FIG. 7 is a flow chart when a rule is edited, and FIG. 8 is a flow chart when a user specifies and activates a rule, and FIG. 9 is a flow chart when a rule is executed in an event-driven manner.

The editing shown in FIG. 7 is all executed by the editor 6. When editing a rule first, registration of a new rule as an editing object or changing of a registered rule is selected (Step 101). When changing a stored rule, one rule is selected from the rule base 1 (Step 102). The selected rule is edited (Step 103). The editor 6 refers to the application dictionary 4 so as to find a rule which can be defined. Before storing the edited rule, the firing flag 31 is checked (Step 104). When the firing flag 31 is ON, the pointer to the relevant rule is registered in the active rule index file 2 for each event type (for example, arrival of the date information and time or reception of a mail) (Step 105). The edited rule is stored in the rule base 1 finally (Step 106).

The user can test whether the registered rule in the rule base 1 operates normally using the tester 11. The user also can generate, copy, or delete the rule base 1 using the librarian 7. When the editing object is creation of a new rule (Step 101), the editor 6 skips the rule selection and starts edition of the rule immediately (Step 103). The subsequent processing is the same as that when a stored rule is changed.

The processing shown in FIG. 8 is processing before the selected rule is actually fired, which is executed by the executor 8, the rule activator 13, the object binder 14, the dispatcher 15, and the OA software 16. In this processing, as mentioned above, the user specifies and activates the rule regardless of the firing flag 31 and the timing which are defined in the rule 20.

Firstly, the user selects the rule to be activated from the rule base 1 (Step 201). Any rule can be selected by the user regardless of the value of the trigger descriptor part 21 and the subsequent processing also can be executed regardless of the value of the trigger descriptor part 21.

The processing shown in FIG. 8 is executed by the executor 8. This processing is one of the characteristics of the present invention and can activate the processing for executing a specific rule by specification of the user by operating the user interface 17 though not in the object data retrieval timing. For example, even a rule which is defined to be activated every Monday can be activated on any day of the week other than Monday by specification of the user. Even for a rule which is not a firing object, the user can activate the processing for executing the rule. For example, although the rule in this embodiment is defined to be activated every Monday, it can be stored that it is not fired for the moment with the definition statement left. Also in this case, however, it can be activated by specification of the user.

Next, the object data is retrieved by the object binder 14 on the basis of the rule retrieval condition which is selected previously (Step 202). Whether the object data exists or not is judged (Step 203). When no object data is found, the processing ends. This processing is executed by the rule activator 13. When the object data which satisfies the retrieval condition is found, the confirmation flag 33 is judged (Step 204). When the confirmation flag 33 is ON (indicating that confirmation by the user is required), whether or not to activate the action described in the rule is confirmed by the user (Step 205). This processing is executed by the confirmer 9. When the user approves activation (Step 206), the action is executed (Step 207). When the user does not approve it, the processing ends.

When the confirmation flag 33 is OFF inversely (indicating that confirmation by the user is not required), the processing defined in the action part of the rule is executed immediately (Step 207). This processing is executed by the dispatcher 15.

FIG. 9 is an operation flow chart of activation of a rule registered in the active rule index 2 when the firing flag is ON.

Events are monitored by the event monitor 12 (Step 301). When no event is detected, the processing is always looped back to Step 301 (Step 302). When an occurrence of event is detected (Step 302), whether it is an event for specifying end or not is judged first (Step 303). When it is an event for specifying end, the processing ends immediately. When the detected event is other than it, the rule activator 13 is notified of it by the event monitor 12, and retrieves the active rule index file 2 wherein the contents of the trigger descriptor part 21 are indexed, and extracts the rule which is to be activated when the event occurs (Step 304). When no rule to be activated is found, the processing is returned to Step 301 (Step 304).

When a rule to be activated is found, whether there is object data or not is retrieved by the object binder 14 on the basis of the retrieval condition of the extracted rule (Step 305). Whether there is object data or not is judged (Step 306). When no object data is found, the processing is returned to Step 304. When object data which satisfies the retrieval condition is found (Step 306), the processing defined in the action part of the rule is executed (Step 307). This processing is executed by the dispatcher 15. Action records (the time and type of action executed and the type of rule used) are stored in the action log file 3 so that the user can refer to the processing performed by the electronic secretary system later (Step 308). The user can refer to the contents of the action log file 3 later by activating the reporter 10. Next, the repetition flag 32 is judged (Step 309). Only when the repetition flag 32 is ON, the rule is deleted from the active rule index file 2, and the firing flag is changed to OFF (Step 310), and even if an event described in the trigger descriptor part 21 of the rule occurs thereafter, the rule is not activated.

Thereafter, the processing is returned to Step 304 and whether there is another rule to be activated or not is judged.

The above flow operation will be explained with reference to FIGS. 3 to 6.

As shown in FIG. 6, it is assumed that Table 53 of Ota is stored in the mail box 51 of the object file 5 and Table 54 of Sato is stored in the budget file 52. Rule 1 and Rule 3 shown in FIGS. 3 and 5 are firing objects. Rule 2 shown in FIG. 4 is not activated by specification of the user because it has not an OA object having the control information described in the retrieval condition. As to Rule 1 and Rule 3 which are firing objects, only the trigger descriptor part 21 of Rule 1 fetches "9 AM on Thursday" as an event when it is the specified timing, so that Rule 1 checks whether there is object data according to the description of the condition part for object data retrieval 22. Since the Ota object exists in the mail box 51 as shown in FIG. 6, the rule is fired and Table 53 of Ota in the mail box 51 is moved to the budget file 52. In this case, a record of "Since a table exists in the mail box at 9 AM, it is moved to the budget file by Rule 1" is also stored in the action log file 3.

Next, at 9 AM on Friday under this state, Rule 1 is retrieved from the active rule index file 2 as a firing object. However, the rule is not fired because nothing exists in the mail box 51.

On Monday, Rule 3 becomes a firing object. In the status shown in FIG. 6, Rule 3 fires only an object of Table 54 of Sato in the budget file 52. However, when the OA object is moved on Friday, the previous day and Table 53 of Ota is moved from the mail box 51 to the budget file 52 by Rule 1, Rule 3 fires and executes the "summation" defined in the action descriptor part 23c. In this case, a record of "Since the Ota table and the Sato table exist in the budget file at 9 AM on Monday, they are summed up by Rule 3" is also stored in the action log file 3. In this case, it is assumed that the object of "summation" can be fired. Since the repetition flag 32c of Rule 3 is OFF, Rule 3 is not a firing object hereafter.

When the user selects Rule 2 and activates it by the executor 8 thereafter, "Summation" is transferred to "Suzuki" according to the contents of the action descriptor part 23b since the OA object which satisfies the retrieval condition exists in the budget file 52.

As mentioned above, in the electronic secretary system in this embodiment which stores the office processing procedure, the processing procedure is described as a rule comprising the descriptor part for trigger, the descriptor part for object retrieval condition, and the descriptor part for action, and the descriptor part for trigger contains a flag for identifying whether or not to fire a rule and a flag for indicating whether or not to activate repeatedly, and the descriptor part for action contains a flag for identifying whether or not to require confirmation of the user. Therefore, the user can leave his business to the system by his convenient method.

The contents which are automatically processed by the electronic secretary system are recorded in the file. Therefore, the user can refer to the contents including the processing type, item, time, and purpose later.

As mentioned above, according to the present invention, by operating one of the firing flag, the repetitive flag, and the confirmation flag or a combination thereof, the user can leave his business to the electronic secretary system by his convenient method or can cancel it freely. Therefore, he can allow the OA processing to be flexibly executed in the same was as with a human secretary.

What is claimed is:

1. A method of executing a rule in a system having a rule base for storing rules each including a condition part, an action descriptor part, files for storing object data, and a user interface means comprising the steps of:

setting a value to a flag indicating whether a rule having said flag is to be automatically activated or not, said flag being included in a trigger descriptor part provided in at least one rule of the rules stored in said rule base, said trigger descriptor part being a third part included in the rule in addition to said condition part and said action descriptor part;

specifying timing data to said at least one rule, for retrieving object data through said user interface means;

fetching, when a current timing matches with the specified timing data a rule whose flag indicates the value that the rule having said flag to be automatically activated;

fetching object data which satisfies the condition part defined in the fetched rule; and executing a process defined in the action descriptor part of the rule with the fetched object data.

2. The method as stated in claim 1 further comprising the steps of:

specifying a confirmation value in a confirmation flag included in said action descriptor part of said at least one rule, for confirming whether a process defined in said action descriptor part is to be automatically executed, or executed after a user confirms it through said user interface means;

fetching the rule whose flag indicates the value that the rule having said flag is to be automatically activated;

fetching object data which satisfies a retrieval condition defined in the fetched rule; and executing said process defined in said action descriptor part, according to said confirmation value in said confirmation flag, with the fetched object data.

3. A method as stated in claim 2, wherein each rule stored in said rule base has said condition part for object data retrieval, further comprising the steps of:

checking binding of the object data included in software resources, with said process defined in the action descriptor part, in accordance with said condition part for object data retrieval being specified;

specifying an operation command of said software resources for said process; and performing said operation command.

4. A method stated in claim 1, further comprising the step of:

specifying, through said user interface means, a repetition flag as said timing data, indicating a value at which to fire each of said at least a rule for repetitively executing said process after said rule is once fired.

5. A method as stated in claim 1, wherein each rule stored in said rule base includes said condition part for retrieving object data, the method further comprising the steps of:

checking binding of the object data included in files, with said process defined in the action descriptor part, in accordance with said condition part for retrieving object data being specified;

specifying an operation command of said software resources for said process; and performing said operation command.

6. A method as stated in claim 1 further comprising the step of:

activating said process defined in the action descriptor part, by specification of a user through said interface means., irrespective of said timing data.

7. A system for executing a rule, in a system having a rule base for storing rules each including a condition part and an action descriptor part, files for storing object data, and a user interface means comprising:

means for setting a value to a flag indicating whether a rule having said flag is to be automatically activated or not, the at least one rule being configured to provide a trigger descriptor part being a third part included in the rule in addition to said condition part and said action descriptor part, said flag being included in said trigger descriptor part in at least one rule stored in said rule base;

means for specifying timing data to said at least one rule, for retrieving object data through said user interface means;

means for fetching at least one rule whose flag indicates the value that the rule having said flag is to be automatically activated, when a current timing matches with the specified timing data;

means for fetching object data which satisfies the condition part defined in the fetched rule; and means for executing a process defined in the action descriptor part of the rule with the fetched object data.

8. The system for executing a rule as stated in claim 7 further comprising:

means for setting a specific value to a flag for indicating whether a rule having said flag is to be automatically activated or not, said flag being included in said trigger descriptor part in at least a rule in the rules stored in said rule base;

means for specifying a confirmation value in a confirmation flag included in said action descriptor part of said at least a rule, for confirming whether a process defined in said action descriptor part is to be automatically executed, or executed after a user confirms it through said user interface means;

means for fetching the rule whose flag is set with said specific value;

means for fetching object data which satisfies retrieval condition defined in the fetched rule; and means for executing said process defined in said action descriptor part, according to said confirmation value in said confirmation flag, with the fetched object data.

* * * * *